March 22, 1932.  A. B. DIETERICH  1,850,279
CORN SHELLER
Filed April 6, 1927  5 Sheets-Sheet 1

Witness
Milton Lenoir

Inventor.
Arthur B. Dieterich,
John L. Jackson.
By
Attorneys.

March 22, 1932. A. B. DIETERICH 1,850,279
CORN SHELLER
Filed April 6, 1927 5 Sheets-Sheet 2

March 22, 1932. A. B. DIETERICH 1,850,279
CORN SHELLER
Filed April 6, 1927 5 Sheets-Sheet 3

Witness
Milton Lenoir

Inventor.
Arthur B. Dieterich,
John L. Jackson.
By Attorney.

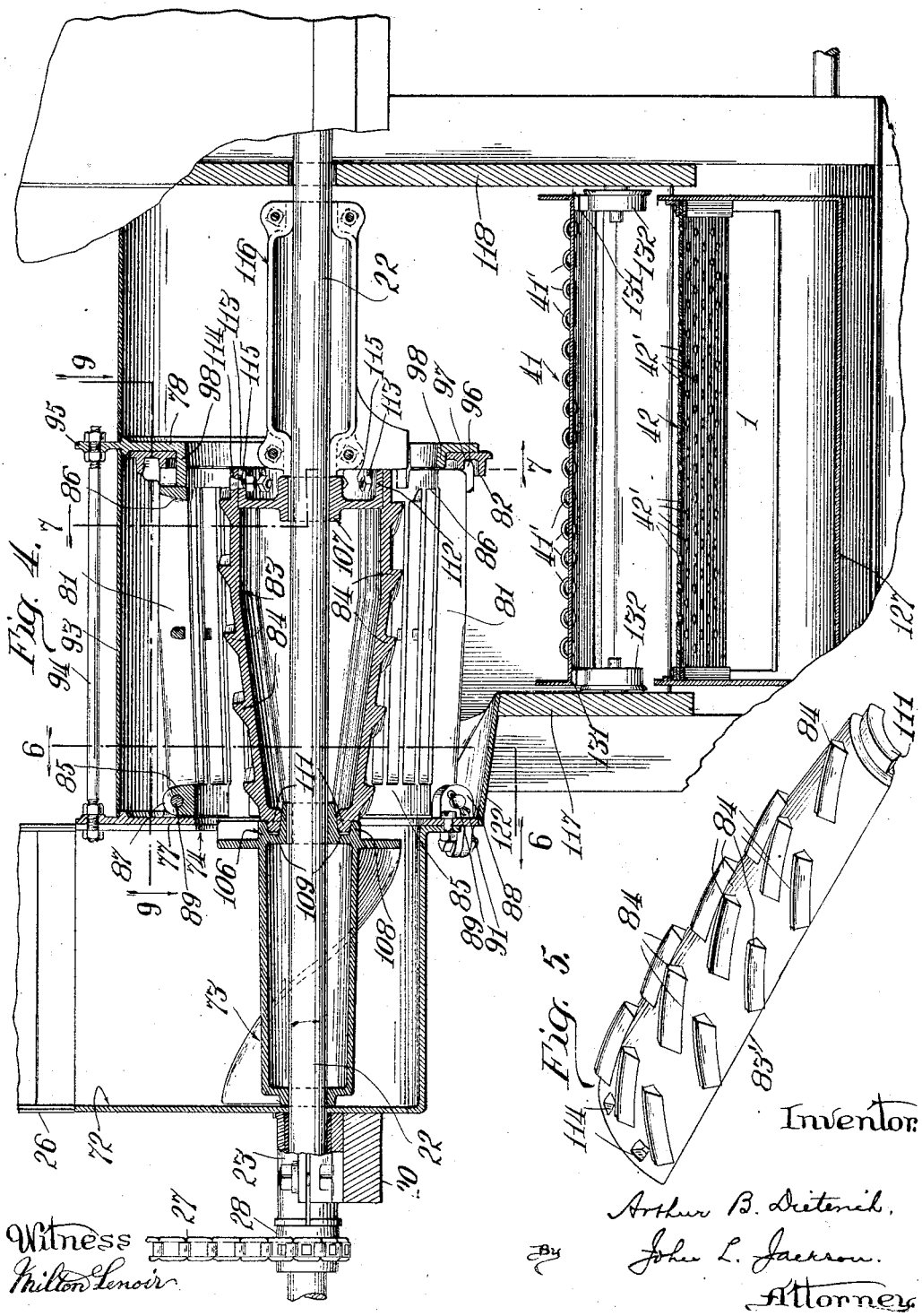

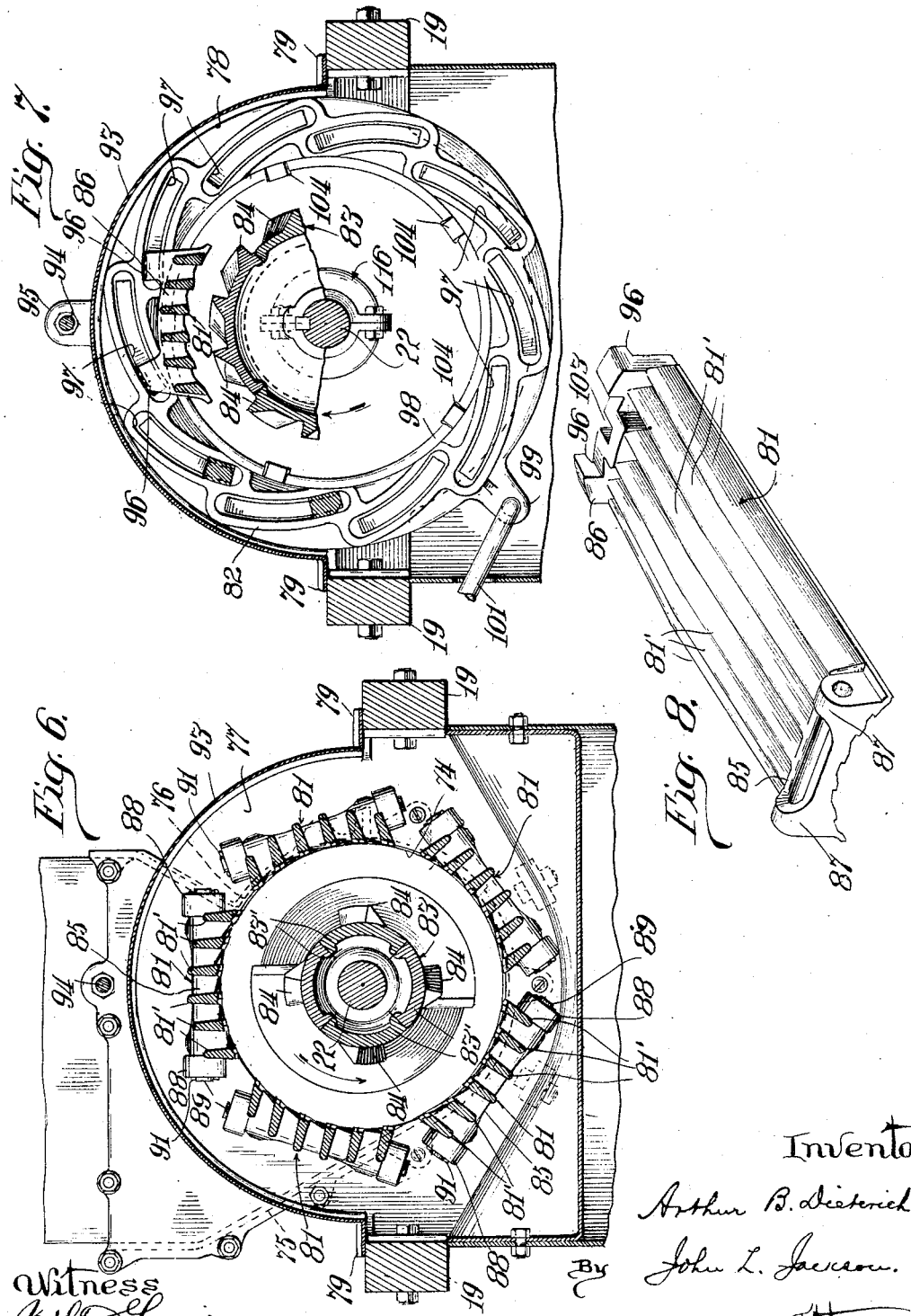

Patented Mar. 22, 1932

1,850,279

UNITED STATES PATENT OFFICE

ARTHUR B. DIETERICH, OF EAST MOLINE, ILLINOIS, ASSIGNOR TO DEERE & COMPANY, OF MOLINE, ILLINOIS, A CORPORATION OF ILLINOIS

CORN SHELLER

Application filed April 6, 1927. Serial No. 181,298.

The present invention relates to corn shellers and has particular reference to a power driven sheller of the cylinder type, although, as will hereinafter appear, the invention embodies numerous features having application to other types of corn shelling machines than the one herein shown.

One of the principal objects of the invention is to reduce the cost of manufacture, operation and maintenance of the machine by eliminating all angle drives between the several operating parts of the machine, such as generally require the use of bevel, worm, or skew gears. The cost of manufacturing these gears is a considerable item, particularly where several are required, as in machines of the present class. As a second consideration, the successful use of gears of this type requires accurate mounting and alinement of the shaft bearings, which introduces additional expense, and which is often times difficult to maintain. Moreover, the gears are usually exposed to the abrasive action of dust and dirt, such being especially true in farm machinery, and their lubrication is usually totally neglected or irregularly performed. Finally, the use of such gears, particularly under these conditions, consumes a considerable part of the power transmitted to the machine. To the end of avoiding these difficulties I have so arranged the several operating parts of the machine that the principal shafts are all substantially parallel, whereby the different drives from one shaft to another are effected entirely by chains and belts.

A further object of the invention is to provide an improved construction of sheller mechanism, characterized by an improved mounting of the staves of the sheller cylinder, and by a sectional form of cylinder head wherein the sections or slabs thereof have improved mounting permitting of their ready removal.

A further object of the invention is to provide an improved design of hopper cooperating with the feed screw or worm which feeds the ears of corn into the sheller cylinder, such hopper embodying improvements for securing a more positive feed of the ears of corn to the screw and for preventing the screw from throwing kernels or pieces of cob out of the hopper.

A further object of the invention is to provide an improved arrangement of power drive for the grain screw and for the elevator that receives the grain from such screw. This improved drive arrangement has been devised to prevent continued operation of the grain screw in the event that the elevator ceases operating, which condition, when arising in prior machines, usually results in the grain being forcibly packed into the elevator boot and causing the same to burst.

A further object of the invention is to provide an improved arrangement and construction of drive mechanism for operating the cob stacker, such drive mechanism permitting the stacker to be swung laterally for delivery to the different points of the cob pile, and permitting the stacker to be adjusted to a greater or less vertical inclination for also adjusting the point of delivery of the stacker to the pile.

Other objects of the invention will appear from the following description of a preferred embodiment thereof, such embodiment being of the wheeled or portable type.

In the drawings illustrating this embodiment:

Fig. 4 is a longitudinal sectional view through the sheller cylinder, corresponding to a section on the plane of the line 4—4 of Fig. 3;

Fig. 5 is a perspective view of one of the sheller head sections;

Fig. 6 is a transverse sectional view through the sheller cylinder, taken on the plane of the line 6—6 of Fig. 4;

Fig. 7 is a similar view taken on the plane of the line 7—7 of Fig. 4 and looking in the opposite direction;

Fig. 8 is a perspective view of one of the cylinder staves;

Fig. 9 is a horizontal sectional view taken on the plane of the line 9—9 of Fig. 4, illustrating the mounting of the cylinder staves.

Figure 1:
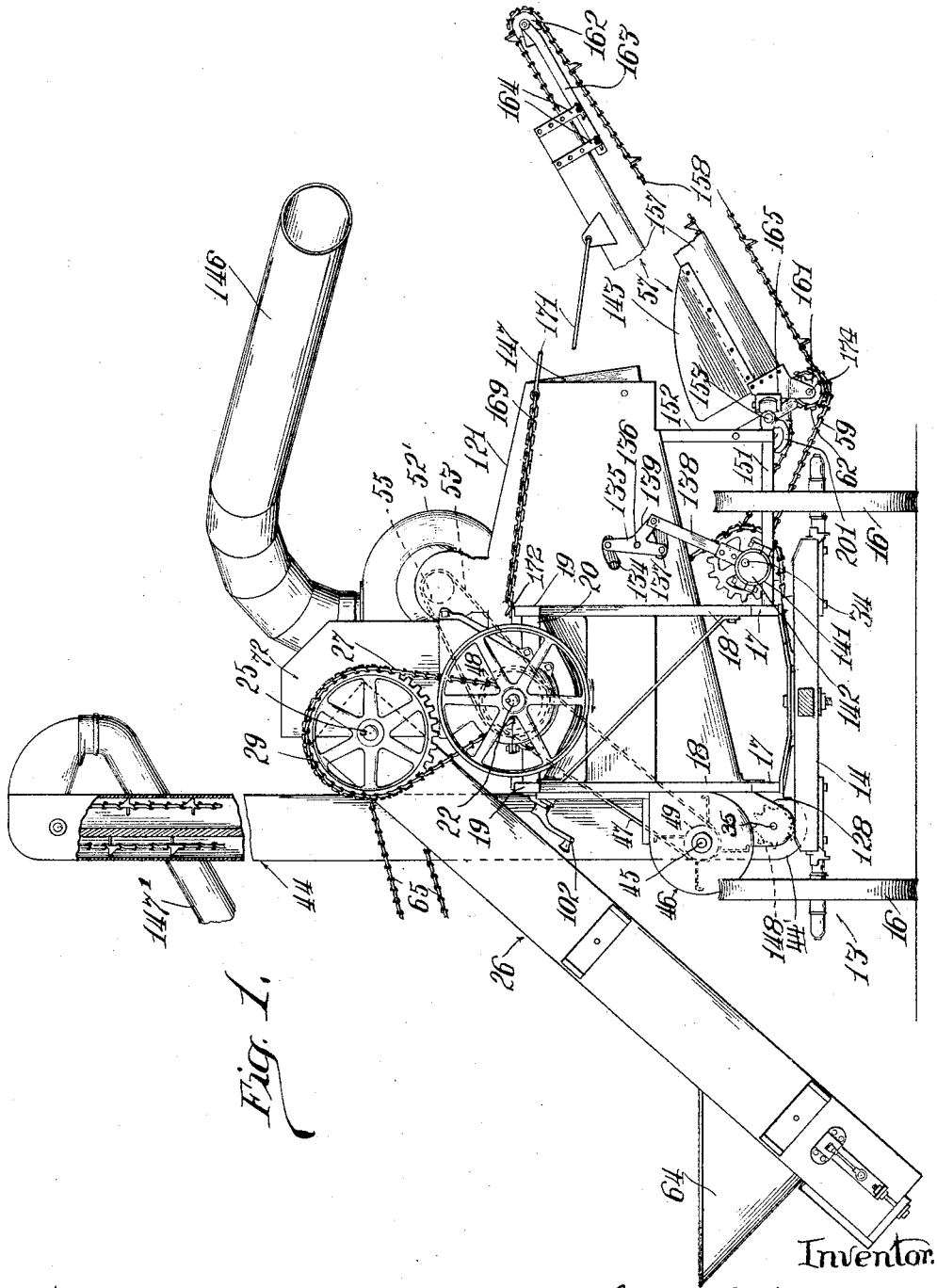
Fig. 1 is an elevation of the entire machine, corresponding to a front view with respect to the running gear of the machine.

In the transportable embodiment of my invention, the several operating parts of the machine are all assembled upon a suitable running gear 13, comprising, for example, front and rear axles 14 and 15 on which are mounted wheels 16. Supported on these axles are two longitudinally extending lower sills 17 from which rise upwardly extending frame members 18 supporting longitudinally extending frame members 19 at their upper ends. These upper frame members may be cross braced by members 20.

Figure 2:
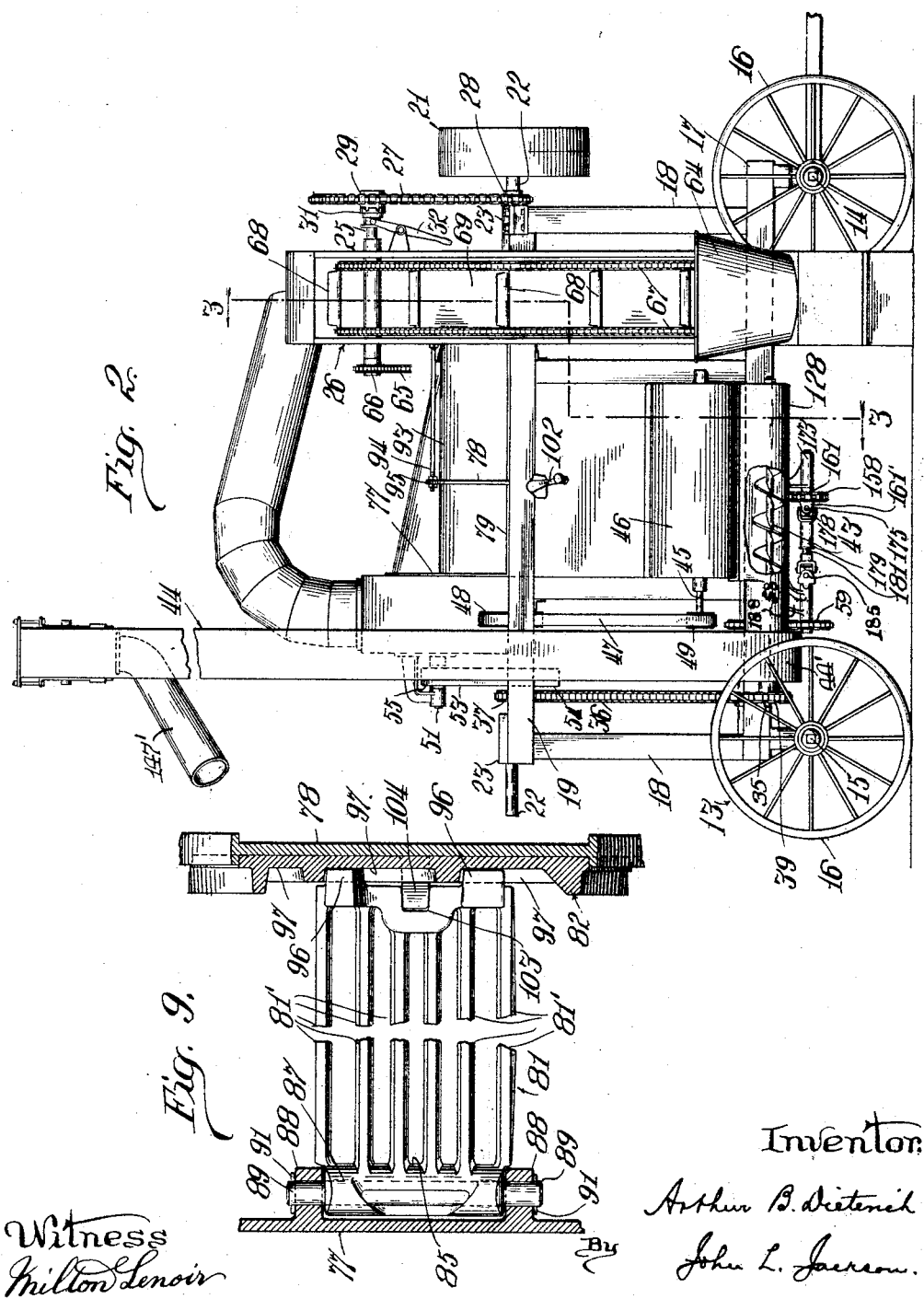
Fig. 2 is another elevational view of the machine, as viewed from the left in Fig. 1.

The belt pulley which receives the power drive from the tractor, stationary engine, or other source of power supply, is indicated at 21, and it will be observed from Figs. 1 and 2 that this pulley is mounted on a main drive shaft 22 extending longitudinally of the running gear 13. Thus, the belt pull is at right angles to the running gear so that when the wheels 16 are sunk in trenches—usually dug for anchoring the machine—there will be minimum possibility of this belt pull causing the machine to shift. As before remarked, all of the principal operating shafts of the machine are disposed substantially in parallelism with the main power shaft 22, whereby the transmission of power between these several shafts is all effected by sprocket chains and belts. I shall refer briefly to the driving relation between the shafts before proceeding with a detail description of the various parts.

The main drive shaft 22 extends throughout the entire length of the upper frame structure, projecting at each end thereof beyond the end bearings 23, so that the belt pulley 21 can be mounted on either end of the shaft. As will be hereinafter described, the sheller mechanism is mounted on this main shaft. A drive is carried from the front end of the latter shaft up to an upper feeder shaft 25 constituting part of the feeder mechanism 26 which conveys the ears of corn up into the hopper of the sheller mechanism. Preferably this drive consists of a chain 27 passing over a small sprocket wheel 28 on the main shaft 22 and over a large sprocket wheel 29 on the feeder shaft 25, although, of course, a belt drive might be employed in lieu of this chain drive. A suitable jaw clutch 31, actuatable by a lever 32, serves to connect or disconnect the upper sprocket 29 and the feeder shaft 25.

A second drive is carried down from the rear portion of the main shaft 22 to an agitating shaft 34 and to a grain screw shaft 35. This drive also preferably consists of a chain 36 passing over a sprocket wheel 37 on the drive shaft and over sprocket wheels 38 and 39 on the agitator and grain screw shafts, respectively, (see Fig. 3). The agitator shaft 34 imparts an eccentric or crank motion to the two cleaning shoes 41 and 42, respectively, and the other shaft 35 drives a grain feed screw 43 and a grain elevator 44, as will be hereinafter described.

A third drive is carried down from the rear portion of the main shaft 22 to a shaft 45 on which is mounted a blast fan 46 for projecting air under the cleaning shoes. This drive preferably consists of a belt 47 passing over a pulley wheel 48 on the main drive shaft and over a pulley wheel 49 on the blast fan shaft (Fig. 2). A fourth drive is carried from the rear portion of the main shaft up to a shaft 51 on which is mounted a suction or shuck fan 52 for lifting the husks, silks and trash from the cleaning zone of the machine. This drive preferably consists of a belt 53 passing over pulley wheels 54 and 55 mounted respectively on the main shaft 22 and on the shuck fan shaft 51. The drive for the cob stacker 57 is preferably carried from the agitating or eccentric shaft 34 to a cob stacker drive shaft 58 supported at one side of the machine, this drive preferably consisting of a chain 59 passing over sprocket wheels 61 and 62 on the shafts 34 and 58, respectively.

All of the above-mentioned shafts are substantially parallel, thus making possible the inter-connection of these shafts by chains, belts, or like forms of flexible driving members, and hence avoiding the use of gears with their objectionable cost, wear and loss of power. In securing this relation of the several operating shafts I have found it desirable to so organize the working parts of the machine that the general path of travel of the cobs from the point where the unshelled cobs are conveyed up to the sheller cylinder by the main feeder 26, to the point where the shelled cobs are delivered to the cob stacker 57, is in a plane extending transversely across the running gear 13, this being more apparent from Fig. 3. The description of the several operating parts of the machine will be facilitated by describing these parts as they occur in this path of travel of the cobs through the machine.

The ears of corn are dumped into a hopper 64 situated at the lower end of the upwardly inclined main feeder 26 (Figs. 1 and 2). The ears may be shoveled directly into this hopper or may be conveyed thereto by one or more extension feeders leading from a crib or other point of supply. The power for operating such extension feeder or feeders may be derived from the upper feeder shaft 25, the portion of chain 65 leading from the sprocket 66 on said shaft representing a power take off for driving such extension feeder. The main feeder 26 comprises any suitable conveyor of a belt or chain type, the preferred construction shown in Figs. 2 and 3 consisting of two spaced chains 67 across which extend a plurality of flight plates or bars 68. The upper course of this conveyor moves up along a transverse partition 69 extending between the side boards of the feeder, and passes around sprockets 71 mounted on the upper feeder shaft 25.

Figure 3:
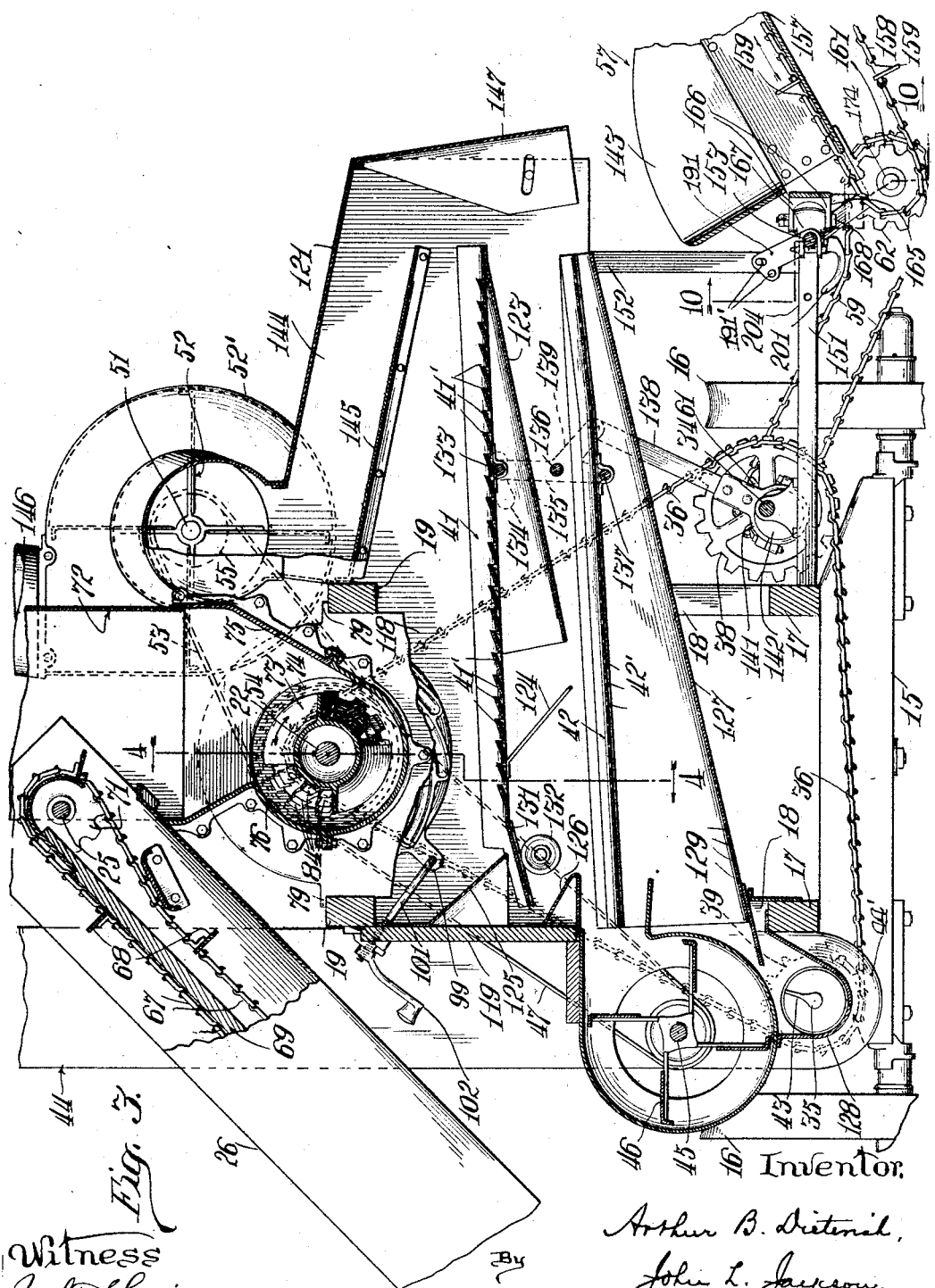
Fig. 3 is a vertical sectional view through the main operating parts of the machine, taken approximately on the plane of the line 3—3 of Fig. 2.

The ears of corn drop from the upper end of this conveyor down into a hopper 72 situated between the upper longitudinal frame bars 19. The main drive shaft 22 extends through this hopper and has mounted thereon a feed worm 73 which serves to move the ears endwise into the sheller cylinder 74. It will be observed that by having the conveyor of the main feeder discharge over the side of the hopper, the flight bars of the conveyor will tend to drop the ears of corn down into the hopper with the length of the ears extending parallel to the feed worm, thus facilitating the rapid feeding of the corn. The bottom of the hopper 72 has a cylindrical or trough shaped curvature extending around the feed worm 73, (Fig. 3). The worm rotates in the direction indicated by the arrow, and that wall of the hopper leading to the downwardly rotating side of the feed worm is sloped, as indicated at 75, to guide the ears of corn down into engagement with a relatively low point on this downwardly rotating side of the feed worm so as to assure rapid feeding of the ears thereby. The opposite wall of this through or hopper bottom is curved upwardly and over a considerable part of the upwardly moving side of the worm, as indicated at 76, to embrace this side of the feed worm. The puropse of having the wall 76 partially embrace this side of the feed worm is to prevent the worm from throwing ears, kernels, and pieces of cob upwardly and out of the hopper, it being evident that anything thrown upwardly at this side of the worm will be deflected by the wall 76 over against the opposite wall of the hopper where such ears or pieces of cob will again drop down into the feed worm.

Referring to Fig. 4, the sheller cylinder is supported between two frame plates 77 and 78, the former constituting the end wall of the hopper 72, and both plates having mounting brackets or lugs 79 (Fig. 3), by which these plates are secured to the longitudinal frame beams 19. Both plates have circular openings therein alined axially with the main drive shaft 22, these openings corresponding to the feeding and discharge openings of the sheller cylinder. The cylinder is constructed in the form of a cage consisting of a plurality of circularly arranged staves 81 having hinged connection with the frame plate 77 and having operative connection at their other ends with an adjusting ring 82 by which the staves may be moved inwardly or outwardly, radially of the cylinder, to adapt the sheller mechanism to ears of different sizes. Mounted on the shaft 22 for rotation within the cylinder is a sheller head 83, the surface of which is studded with teeth 84 which cooperate with the cylinder staves in shelling the kernels of corn from the cobs.

Referring to the construction of the staves 81, as shown in Figs. 6, 8 and 9, each stave comprises a plurality of parallel bars 81' integrally joined at the opposite ends of the stave by transverse webs 85 and 86. As viewed in section, see Fig. 6, the bars 81' are offset from each other so that their inner edges form an arcuate grate surface corresponding to the curvature of the cylinder. The transverse web 85 at the hinge end of the stave is formed with apertured pivot bosses 87 disposed adjacent the side margins of the stave. These pivot bosses engage between apertured lugs or ears 88 which project from the face of the frame plate 77, hinge pins 89 being passed through the lugs 88 and bosses 87. It will be observed that the parts are so arranged that the hinge pins of the several staves will readily clear each other and the adjacent pivot lugs 88 in removing these pins endwise for the purpose of removing or replacing staves. The hinge pins may be held in place by cotter pins or keys 91 passing through their ends. It will be observed that the construction described affords a considerable length and area of bearing surface pivotally connecting the cylinder staves to the frame plate 77, which length of bearing is desirable for resisting the tendency of the staves to rotate with the sheller head 83. The top of the sheller cylinder is closed over by a semi-cylindrical cover 93 which can be readily removed for affording access to the cylinder staves and to the sheller head 83. A tie rod 94 is preferably extended between the frame plate 77 and a lug 95 projecting upwardly from the opposite frame plate 78.

The transverse web 86 at the other end of each stave has angularly inclined lugs or keys 96 extending from the ends of the web, such lugs or keys being adapted for reception in pairs of arcuate, inclined slots 97 formed in the adjusting ring 82. As will be seen from Fig. 4, the frame plate 78 has an inwardly projecting annular flange 98 which defines the discharge opening from the sheller cylinder, this flange forming a circular guide surface on which the ring 82 has rotatable mounting. A lug 99 extends outwardly from this ring (Fig. 7) for establishing pivotal connection with the end of a stave adjusting screw 101 extending out through the side of the machine. As shown in Fig. 3, the outer end of the member 101 is threaded for receiving the threaded hub of an adjusting crank 102. It will be evident that by rotating this crank the ring 82 may be revolved forwardly or backwardly to cause the lugs 96 of the staves to move inwardly or outwardly in the inclined slots 97, thereby simultaneously adjusting all of the staves inwardly or outwardly for adapting the sheller mechanism to ears of different sizes. Referring to Fig. 8, the end web 86 of each stave is formed with a radially extending slot 103 which is adapted to engage with a corresponding key projection 104 extending inwardly from the ring flange 98 of the frame plate 78. The engagement of the slots 103 over these keys 104 results in the rotative stresses imparted to the staves being borne by the frame plate 78, such engagement of the slots 103 over these keys permitting the inward and outward adjustment of the staves, as above described.

The teeth 84 on the sheller head 83 are inclined with a screw-like pitch, so that these teeth tend to feed the cobs forwardly in the cylinder toward the discharge end thereof, as the kernels are being removed from the cob. It will be noted that the head also tapers to a larger diameter toward this end of the cylinder, so that the cobs are gradually advanced through a ring-like opening of decreasing size. The head is of sectional construction, consisting of a plurality of longitudinally extending sections 83', these being of laterally tapering width, as shown in Fig. 5, to form the longitudinal taper of the head. A hub mounting for these sections is provided in the form of two end hub members 106, 107, both keyed to the driving shaft 22. The hub member 106 at the small end of the head may advantageously be formed as an integral part of the feed worm 73, such hub member consisting of an inner annular portion extending longitudinally of the shaft and an outer flange 108. A plurality of arcuate sockets 109 are formed in the face of this hub member, being circularly arranged between the inner annular portion and the outer flange 108, these sockets being separated by radially extending ribs. The small end of each head section 83' is formed with an arcuate tenon or tongue 111 (Fig. 5) projecting therefrom for insertion in one of the sockets, the side edges of this tongue being set back from the side edges of the section so as to accommodate the radially extending ribs which separate the sockets. It will be observed that when these head sections are thus inserted endwise into such sockets they are rigidly secured against radial displacement or circumferential movement.

The hub member 107 at the opposite end of the head has an outwardly projecting flange 112 having a plurality of spaced slots 113 extending inwardly from the edge of the flange. The corresponding ends of the head sections 83' are provided with two or more openings 114 therein adapted to receive bolts 115 which pass in through the slots 113 for securing the head sections to this hub. By providing the slots 113 in the flange 112 it is not necessary to entirely remove the bolts 115 in removing a section of the head, as by loosening the bolts and sliding the section endwise the tongue end 111 thereof can be withdrawn from its socket and the entire section quickly released for substitution or repair.

As the shell cobs leave the discharge opening of the cylinder they encounter a rotating beater 116, preferably consisting of two axially split sections which are clamped upon that portion of the drive shaft between the cylinder and the side wall of the cleaning case. This cleaning case comprises the two side walls 117 and 118, the end wall 119 and the end hood 121 (Fig. 3). The semi-cylindrical hood 93 which extends over the top of the sheller cylinder also closes the top of the cleaning case at this point. A chute-like plate 122 (Fig. 4) extends downwardly from the frame plate 77 to the upper edge of the adjacent side wall 117. It will be observed that the cleaning case extends transversely across the chassis of the machine, this being a part of the preferred design whereby all of the main operating shafts are supported in parallel relation.

All of the shelled corn drops through the cylinder staves upon the upper cob shoe 41; similarly all of the cobs, husks, silks, et cetera, drop from the discharge end of the cylinder upon this cob shoe. It will be observed from Fig. 3 that the axis of the cylinder and beater extends transversely across the shoe and that such cylinder is at the rear end thereof so that all of the material dropping down upon the cob shoe from the sheller cylinder has the entire length of the shoe to pass over in moving to the discharge end thereof, thereby tending to greater separating and cleaning efficiency. The cob shoe slopes upwardly towards its discharge end, and has a punched surface producing inclined teeth 41' which operate in the oscillatory movement of the shoe to feed the cobs upwardly to the discharge end of the shoe. In such oscillatory, or to and fro reciprocating motion of the shoe, the corn separated from the refuse material is free to drop down through the punched openings 41' upon the grain shoe 42. An inclined chute 123, carried on the under side of the cob shoe adjacent to its outer end, directs the corn sifting through this portion of the shoe back towards the intermediate portion of the grain shoe 42; and a deflector 124 extending down from the rear portion of the cob shoe performs a similar function with respect to the corn sifting down through the rear portion of the cob shoe. Stationary sloping deflectors 125 and 126 are disposed above the inner end of each of the shoes, to aid in the screening operation. An inclined chute 127 is disposed below the grain shoe 42, extending throughout its entire length and discharging into the trough 128 of the grain screw. The openings 42' in the grain shoe are just large enough to drop the shelled corn down through such shoe on to the inclined chute 127. A plurality of relatively small openings 129 are provided in the lower portion of the chute 127, such openings forming a sand screen for precipitating any sand or dirt from the corn. The inner end of the cob shoe has downwardly sloped rail portions 131 which ride on the rollers 132, pivotally supported on the side walls of the case. The outer end of the cob shoe is supported on a laterally swinging rod 133 which extends transversely through slotted openings 134 in the side walls of the case. The ends of this rod have support in the upper arms of rockers 135 disposed on the outer sides of the case, such rockers being keyed or otherwise secured on the outer ends of a transversely extending rock shaft 136. A second swinging rod 137 extends through the lower arms of these rockers and supports the outer end of the grain shoe 42. The inner end of the grain shoe may be supported in any preferred manner, either on swinging links or on a suitable guide surface, arranged to permit of its endwise reciprocation. It will be evident that rocking movement of the shaft 136 will impart oscillatory or reciprocatory movement to the two shoes, thus agitating these shoes to obtain the desired screening and feeding movement. Such rocking movement of the shaft 136 is obtained through a link 138 having pivotal connection at its uper end with an arm 139 extending from one of the rockers, and having its lower end suitably fastened to an eccentric strap 141 embracing an eccentric 142 on the agitating shaft 34. The cobs are fed along the cob shoe 41 to the end thereof, where they drop into the hopper 143 of the cob stacker mechanism; and the clean corn gravitates down along the chute 127 into the grain screw through 128.

The blast fan 46 extends across the entire end of the cleaning case, such blast fan being, of course, enclosed in a suitable fan housing, and this housing has its discharge opening disposed to direct a blast of air below each of the shoes 41 and 42. The air in passing up through and over the tops of the shoes picks up the silks, husks and other light refuse and conveys it to the ends of the shoes, where the current of air is deflected upwardly and backwardly through a channel or wind throat 144 defined between the hood 121 and a transverse partition 145. The deflection of the air stream with its suspended light refuse up through this wind throat is induced by the action of the suction or shuck fan 52, the wind throat 144 leading into the inlet opening of the fan housing 52'. From the outlet opening of this fan housing a spout 146 directs the light refuse to any desired point. A hinged, adjustable, gate or flapper 147 closes this end of the cleaning case.

The corn discharged into the grain screw 43 is conveyed rearwardly thereby to the lower boot portion 44' of the elevator 44, where it is picked up by the buckets or flights of the elevator and carried up to a grain spout 147'. This grain spout may be supported for swinging movement so that the grain can be discharged to any desired point. Attention is directed to the fact that the grain screw 43 and the lower sprocket wheel 148 (Fig. 1) of the elevator are driven from the same shaft 35; in preferred practice this shaft is divided into two sections joined by a square socket fitting, but for the purposes of the present description these two shafts may be considered as one. As heretofore described, the drive to the grain screw occurs through the chain 36 passing over the sprocket wheel 39 mounted on the shaft 35. It will be observed from Fig. 2, that this sprocket wheel is mounted on the rear end of the shaft 35, beyond the elevator 44, so that the drive of the grain screw is effected through that portion of the shaft 35 on which the elevator sprocket wheel 148 is mounted. Hence the grain screw cannot possibly rotate except when the elevator sprocket wheel is rotating. This prevents all possibility of the grain screw continuing to feed grain into the elevator boot with the elevator inert through jamming or interruption of its drive, which in prior machines frequently results in the bursting of the elevator boot. The sprocket wheel 39 through which the elevator and grain screw are driven is preferably of the friction slippage type, well known to those skilled in the art. By the provision of this type of sprocket wheel any jamming of the elevator or grain screw will be prevented from breaking the operating parts, through slippage of the sprocket wheel.

Referring now to the cob stacker mechanism, as shown in Figs. 1 and 3, this mechanism is supported in a frame structure consisting of horizontal bars 151 extending laterally from the chassis and re-enforced by vertical struts 152. A pipe bar 153 is mounted in the ends of the horizontal supporting bars 151, and supported on the intermediate portion of this pipe bar is a swivel member 154 which supports the lower end of the stacker. This swivel member is held on the pipe bar by vertically extending pins 155 passing through upper and lower ears on the swivel member, by the removal of which pins the swivel member can be dismounted from the pipe bar. The swivel member is held against shifting along the pipe bar by cotter pins 156 releasably secured in the bar. The stacker comprises a long trough 157 in which travels the conveyor chain 158, the latter having the usual flight bars 159. The hopper 143, which is supported on the rear end of the trough, directs the cobs into the path of the conveyor chain. At the lower end of the stacker the conveyor passes over a sprocket wheel 161, and at the upper end of the stacker the conveyor passes over an adjustable sprocket wheel 162. The adjustment of this latter wheel is effected by sliding the two supporting bars 163, between which the sprocket wheel is pivoted, forwardly or backwardly relative to the hanger brackets 164 extending downwardly from the end of the trough.

A bracket 165, secured to the end of the trough 157, has a U-shaped bearing portion 166 which engages over a bearing boss 167 projecting from the swivel member 154. A pivot bolt 168 passes down through alined openings in the upper and lower arms of the U-shaped bearing portion 166 and in the bearing boss 167. The pivotal connection established by the bolt 168, together with the rotatable mounting of the swivel member 154 on the pipe bar 153, afford a universally jointed support for the lower end of the stacker, the pivot bolt 168 permitting horizontal swinging movement of the stacker from side to side and the swiveling action of the swivel member 154 permitting raising and lowering of the stacker about the axis of the pipe bar 153. The stacker is held in any adjusted position through the medium of two chains 169 which connect through links 171 with each side of the stacker adjacent its outer end. These chains are adapted to engage with hooks 172 mounted on the main frame of the machine at each side of the cleaning case, and by drawing in or paying out these chains the stacker may be raised or lowered and swung to one side or the other. The details of the stacker per se and its mounting upon the sheller will be best understood from my copending application, Serial No. 382,347, filed July 31, 1929, which is a division of the instant application.

The bracket or end plate 165, secured to the lower end of the stacker trough, has a depending portion with which is formed integrally a long bearing boss 173. Rotating within this boss is a shaft 174 on which is mounted the lower sprocket wheel 161 over which the conveyor chain travels. Projecting from the face of this gear are two spaced lugs 161' supporting a pivot pin 175 on which is pivoted a knuckle, constituting part of a universal joint in the driving train to the sprocket. Pivotally connected to this knuckle on a pivot pin, extending at right angles to the pivot pin 175, is the forked end 178 of a socket member 179. This member has a socket of square cross-section extending longitudinally thereof and adapted for telescopic sliding engagement over a square shaft 181. The opposite end of such shaft is pinned in a yoke 182 having pivotal connection through a pivot pin with a universal knuckle 184. The latter is in turn secured to the end of the cob stacker drive shaft 58. The latter shaft is journaled in a long bearing boss formed as a part of a bearing bracket 188 having swinging support on the pipe bar 153 through spaced bosses. When the machine is set up for operation the swinging bearing bracket 188 is fixedly held in the position shown in Figure 3 by an arm 191 extending from the bracket and adapted to be fastened to the adjacent vertical strut 152 by a bolt 191'.

The sprocket 62 which transmits power to the cob stacker drive shaft 58 is preferably of the friction slippage type, so that in the event that the cob stacker should become jammed, this sprocket wheel will slip and thus prevent breakage of the parts. The details of this clutch will be best understood from the detailed disclosure in my above mentioned divisional application. A chain tightener 201, of shoe-like form as shown in Fig. 3, is mounted on the projecting end of the pipe bar 153 for engaging with the chain 59, this chain tightener being held in any desired position on the pipe bar by a set screw 202.

While I have shown what I consider to be the preferred embodiment of my invention, it will be understood that such embodiment is merely exemplary, and that numerous changes and rearrangements may be made therein without departing from the essence of the invention.

What I claim as my invention and desire to secure by Letters Patent, is—

1. In a power driven corn sheller, the combination with a wheeled chassis, of a main drive shaft extending longitudinally of said chassis, a belt pulley on said drive shaft, a sheller cylinder on said drive shaft, a main feeder extending upwardly from one side of said chassis to said sheller cylinder, said main feeder comprising an upper feeder shaft, a flexible driving member passing over wheels on said shafts for driving said feeder from said main drive shaft, a cleaning case projecting laterally from the opposite side of said chassis, upper and lower cleaning shoes in said case receiving the material discharged from said sheller cylinder, an agitating shaft operatively connected to agitate said cleaning shoes in paths extending crosswise of said chassis wheels, a flexible driving member passing over wheels on said agitating shaft and said main drive shaft for driving the former from said main drive shaft, a cob stacking mechanism supported adjacent the end of said cleaning case for receiving the cobs from the upper cleaning shoe, said cobs stacking mechanism comprising a cob stacker drive shaft, and chain and sprocket means for driving said cob stacker drive shaft from said main drive shaft.

2. In a corn sheller, the combination of a sheller cylinder comprising a plurality of stave members, a screw adjusted means cooperating with said stave members at one end of said cylinder for moving said staves inwardly or outwardly, a stationary frame plate adjacent said means, keys projecting from said plate and engaging said staves to prevent lateral movement of the staves, a frame member at the other end of said cylinder, each of said stave members having a pair of spaced pivot bosses adjacent the lateral edges thereof, pivot bosses on said frame member for cooperating with the pivot bosses on said stave members, and a single pivot pin for each of said stave members passing through the pair of pivot bosses on said stave member and through the pivot bosses on said frame member.

3. In a corn sheller, the combination of a sheller cylinder, a shaft extending axially of said cylinder, a sheller head on said shaft divided into a plurality of longitudinally extending sections, tongues on one end of said sections, a hub portion on said shaft for mounting one end of each of said sections and containing sockets to receive said tongues and hold said sections against transverse movement in the hub, a hub portion for mounting the other ends of said sections, and screw means extending radially through the latter hub portion for fastening the latter ends of said sections to such hub portion and holding them against transverse movement with respect to the hub.

4. In a corn shelling mechanism, a shaft, a drum rigidly attached to said shaft, spiral fins on the surface of said drum, a hub section extending outward from said drum along said shaft, a flange extending from the end of said drum parallel to said shaft dividers between said flange and drum, a second flange rigidly attached to said shaft apart from said drum, a plurality of stave sections having one end formed to fit between the dividers and said hub and drum flange and the other end shaped to fit over said second flange, slots in said second flange, and means extending through said slots and staves to rigidly fasten the staves against movement with respect to the shaft.

5. In a corn shelling mechanism, a shaft, a drum rigidly attached to said shaft, spiral fins on the surface of said drum, a hub section extending outward from said drum along said shaft, a flange extending from the end of said drum parallel to said shaft, a plurality of radial dividers between said hub and drum flange dividing the intervening space into a plurality of mortices, a second flange ridigidly attached to said shaft apart from said drum, a plurality of stave sections having a tenon formed on one end to register with said mortices to hold that end rigid with respect to said shaft and having the other end formed to fit over said second flange, slots in said second flange, and bolts extending through said slots and staves to rigidly fasten that end of the staves with respect to said shaft.

ARTHUR B. DIETERICH.